(12) United States Patent
Furuta (10) Patent No.: US 11,359,699 B2
(45) Date of Patent: Jun. 14, 2022

(54) SPEED REDUCER

(71) Applicant: Nabtesco Corporation, Tokyo (JP)

(72) Inventor: Kazuya Furuta, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/075,918

(22) Filed: Oct. 21, 2020

(65) Prior Publication Data

US 2021/0123506 A1 Apr. 29, 2021

(30) Foreign Application Priority Data

Oct. 23, 2019 (JP) .............................. JP2019-192964

(51) Int. Cl.
*F16H 1/32* (2006.01)
*F16C 19/46* (2006.01)

(52) U.S. Cl.
CPC ............... *F16H 1/32* (2013.01); *F16C 19/46* (2013.01); *F16C 2361/61* (2013.01); *F16H 2001/323* (2013.01)

(58) Field of Classification Search
CPC ...... F16H 1/32; F16H 2001/323; F16C 19/46; F16C 2361/61
See application file for complete search history.

(56) References Cited

U.S. PATENT DOCUMENTS 7,553,249 B2 * 6/2009 Nohara ..................... F16C 3/08
475/170

FOREIGN PATENT DOCUMENTS

| DE | 102015222809 A1 | | 5/2016 | |
|----|-----------------|---|--------|---|
| DE | 102015225059 A1 | | 6/2016 | |
| DE | 102015226488 A1 | * | 6/2016 | ............... F16H 1/32 |
| DE | 102016213887 A1 | | 2/2017 | |
| EP | 1471272 A2 | | 10/2004 | |
| JP | 2016-109264 A | | 6/2016 | |

OTHER PUBLICATIONS

Extended European Search Report dated Feb. 22, 2021, issued in corresponding European Patent Application No. 20203347.8 (9 pgs.).

* cited by examiner

*Primary Examiner* — Sherry L Estremsky
(74) *Attorney, Agent, or Firm* — Pillsbury Winthrop Shaw Pittman, LLP (57) ABSTRACT

A speed reduce according to an embodiment of the present invention includes a case having an outer diameter D, a plurality of crankshafts, and a carrier supporting the crankshafts in a rotatable manner. The carrier is rotatable by the crankshafts relative to the case. Each of the plurality of crankshafts includes a plurality of eccentric members each of which has a diameter $dc1$ and a crank journal that has a diameter $dc2$. The crankshaft further includes $n1$ needles that are arranged around each of the plurality of eccentric members and each of which has a diameter size $dr1$, and $n2$ needles that are arranged around the crank journal and each of which has a diameter size $dr2$. In the speed reducer, relational expression $5.5 \leq D/dc1 \leq 7.0$ is satisfied.

20 Claims, 2 Drawing Sheets

SPEED REDUCER

CROSS-REFERENCE TO RELATED APPLICATIONS

This application is based on and claims the benefit of priority from Japanese Patent Application Serial No. 2019-192964 (filed on Oct. 23, 2019), the contents of which are hereby incorporated by reference in its entirety.

TECHNICAL FIELD

The present invention relates to techniques appropriate for a speed reducer.

BACKGROUND

Japanese Patent Application Publication No. 2016-109264 discloses a speed reducer including an external gear, an internal gear that internally meshes with the external gear, a casing provided with the internal gear, and a carrier that rotates relative to the casing.

It is desired to provide a speed reducer with high torsional rigidity and high damping capability. Conventionally, a tapered bearing was used for a crank journal so that the diameter of the crank journal cannot be further increased and its filling cannot be increased, and therefore it was difficult to increase the rigidity and the damping capability of the reducer.

SUMMARY

The present invention is made in light of the above and attempts to accomplish the objective of an increased rigidity and damping capability of a speed reducer.

A speed reducer according to an aspect of the invention includes: a case with internal teeth, the case having an outer diameter D; a plurality of crankshafts arranged on a circumference of an imaginary circle that has a diameter D2 and is centered on a central axis of the case, the crankshafts being spaced away from each other in a circumferential direction of the imaginary circle, each crankshaft having first external teeth; a plurality of external tooth members each having second external teeth that mesh with the internal teeth of the case, the external tooth member being eccentrically movable by the crankshafts; and a carrier supporting the crankshafts in a rotatable manner, the carrier being rotatable by the crankshafts relative to the case. Each of the plurality of crankshafts includes: a plurality of eccentric members corresponding to the plurality of the external tooth members, each of the plurality of eccentric members having a diameter $dc1$: a crank journal corresponding to the carrier and having a diameter $dc2$: $n1$ first needles arranged around each of the plurality of eccentric members, each of the first needles having a diameter size $dr1$: and $n2$ second needles arranged around the crank journal, each of the second needles having a diameter size $dr2$. In the speed reducer, relational expression $5.5 \leq D/dc1 \leq 7.0$ is satisfied.

In the speed reducer according to the aspect of the invention, the cross-sectional area of the eccentric member of the crank is made large with respect to the cross-sectional area of the case when viewed in the axial direction of the case. In other words, by thickening the crankshaft in terms of a balance of the reducer, the number of needles arranged around the eccentric member can be increased. As a result, the number of contacts between the eccentric member and the needles is increased so that the load applied to each needle can be reduced, and thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, the case is formed in a cylindrical shape having an outer diameter D1, and In the speed reducer, $4.5 \leq D1/dc1 \leq 6.0$ may be satisfied.

In the speed reducer according to the aspect of the invention, the cross-sectional area of the eccentric member of the crank is made large with respect to the cross-sectional area of the case when viewed in the axial direction of the case. In other words, by thickening the crankshaft in terms of a balance of the reducer, the number of needles arranged around the eccentric member can be increased. Moreover, the thickness of each needle is set in an appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $2.0 \leq D2/dc1 \leq 3.0$ may be satisfied.

In the speed reducer according to the aspect of the invention, the cross-sectional area of the eccentric member of the crank is made large with respect to the cross-sectional area of the case when viewed in the axial direction of the case. Accordingly the crankshaft is situated away from the central axis of the reducer. In other words, by thickening and disposing the crankshaft at an outward position in the reducer in terms of the balance of the reducer, the number of needles arranged around the eccentric member can be increased. Moreover, the thickness of each needle is set in an appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $6.0 \leq dc1/dr1 \leq 9.0$ may be satisfied.

In the speed reducer according to the aspect of the invention, the cross-sectional area of the eccentric member of the crank is made large with respect to the cross-sectional area of the case when viewed in the axial direction of the case. In other words, by thickening the crankshaft in terms of a balance of the reducer, the number of needles arranged around the eccentric member can be increased. Moreover, the thickness of each needle is set in an appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $6.0 \leq D/dc2 \leq 7.5$ may be satisfied.

In the speed reducer according to the aspect of the invention, the cross-sectional area of the crank journal is made large with respect to the cross-sectional area of the case when viewed in the axial direction of the case. In other words, by thickening the crankshaft in terms of a balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $5.0 \leq D1/dc2 \leq 6.5$ may be satisfied.

In the speed reducer according to the aspect of the invention, the cross-sectional area of the crank journal is made large with respect to the cross-sectional area of the case when viewed in the axial direction of the case. In other words, by thickening the crankshaft in terms of a balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $2.5 \leq D2/dc2 \leq 3.5$ may be satisfied.

In the speed reducer according to the aspect of the invention, the cross-sectional area of the crank journal is made large with respect to the cross-sectional area of the case when viewed in the axial direction of the case. Accordingly the crankshaft is situated away from the central axis of the reducer. In other words, by thickening and disposing the crankshaft at an outward position in the reducer in terms of the balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $6.0 \leq dc2/dr2 \leq 9.0$ may be satisfied.

In the speed reducer according to the aspect of the invention, the cross-sectional area of the crank journal is made large with respect to the cross-sectional area of the case when viewed in the axial direction of the case. In other words, by thickening the crankshaft in terms of a balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $0.85 \leq dc2/dc1 \leq 1.0$ may be satisfied.

In the speed reducer according to the aspect of the invention, the cross-sectional areas of the eccentric member of the crank and the crank journal are made large with respect to the cross-sectional area of the case. In other words, by thickening the crankshaft in terms of a balance of the reducer, the number of needles arranged around the eccentric member and the crank journal can be increased. Moreover, the thickness of each needle is set in an appropriate range, and the number of contacts between the eccentric member and the needles and between the crank journal and the needles are increased so that the load applied to each needle can be reduced. Thereby the damping capability of the speed reducer can be improved. Further, the rigidity can be improved by reducing the variation in the loads applied to the plurality of needles and making the crankshaft thicker at the same time. Further, the damping capability can be improved by setting the thicknesses of the eccentric member, the crank journal, and the needle in an appropriate range. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $0.7 \leq n1 \cdot dr1/\pi(dc1+dr1) \leq 0.9$ may be satisfied.

In the speed reducer according to the aspect of the invention, the cross-sectional area of the eccentric member of the crank is made large with respect to the cross-sectional area of the case. In other words, by thickening the crankshaft in terms of a balance of the reducer, the number of needles arranged around the eccentric member can be increased. Moreover, the thickness of each needle and the number of the needles provided are set in a respective appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $15.3 \leq n1 \leq 28.3$ may be satisfied In the speed reducer according to the aspect, the number of the needles provided around the eccentric member of the crank is set in an appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $0.7 \leq n2 \cdot dr2 / \pi(dc2+dr2) \leq 0.9$ may be satisfied.

In the speed reducer according to the aspect of the invention, the cross-sectional area of the crank journal is made large with respect to the cross-sectional area of the case. In other words, by thickening the crankshaft in terms of a balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $15.3 \leq n2 \leq 28.3$ may be satisfied.

In the speed reducer according to the aspect, the number of the needles provided around the crank journal is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

A speed reducer according to another aspect of the invention includes: a case with internal teeth, the case having an outer diameter D; and a plurality of crankshafts arranged on a circumference of an imaginary circle that has a diameter D2 and is centered on a central axis of the case, the crankshafts being spaced away from each other in a circumferential direction of the imaginary circle. Each crankshaft has an eccentric member that has a diameter dc1. In the speed reducer, relational expression $5.5 \leq D/dc1 \leq 7.0$ is satisfied.

In the speed reducer according to the aspect of the invention, the cross-sectional area of the eccentric member of the crank is made large with respect to the cross-sectional area of the case when viewed in the axial direction of the case. In other words, by thickening the crankshaft in terms of a balance of the reducer, the number of needles arranged around the eccentric member can be increased. As a result, the number of contacts between the eccentric member and the needles is increased so that the load applied to each needle can be reduced, and thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, the case may be formed in a cylindrical shape having an outer diameter D1, and $4.5 \leq D1/dc1 \leq 6.0$ may be satisfied.

In the speed reducer according to the aspect of the invention, the cross-sectional area of the eccentric member of the crank is made large with respect to the cross-sectional area of the case when viewed in the axial direction of the case. In other words, by thickening the crankshaft in terms of a balance of the reducer, the number of needles arranged around the eccentric member can be increased. Moreover, the thickness of each needle is set in an appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, $2.0 \leq D2/dc1 \leq 3.0$ may be satisfied.

In the speed reducer according to the aspect of the invention, the cross-sectional area of the eccentric member of the crank is made large with respect to the cross-sectional area of the case when viewed in the axial direction of the case. Accordingly the crankshaft is situated away from the central axis of the reducer. In other words, by thickening and disposing the crankshaft at an outward position in the reducer in terms of the balance of the reducer, the number of needles arranged around the eccentric member can be increased. Moreover, the thickness of each needle is set in an appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, each of the plurality of crankshafts includes a plurality of needles arranged around the eccentric member, each of the needles having a diameter size dr1, and $6.0 \leq dc1/dr1 \leq 9.0$ may be satisfied.

In the speed reducer according to the aspect of the invention, the cross-sectional area of the eccentric member of the crank is made large with respect to the cross-sectional area of the case when viewed in the axial direction of the case. In other words, by thickening the crankshaft in terms of a balance of the reducer, the number of needles arranged around the eccentric member can be increased. Moreover, the thickness of each needle is set in an appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, each of the plurality of crankshafts includes: a crank journal having a diameter dc2: and a plurality of needles arranged around the crank journal. Each of the needles has a diameter size dr2. In the speed reducer, $6.0 \leq D/dc2 \leq 7.5$ may be satisfied.

In the speed reducer according to the aspect of the invention, the cross-sectional area of the crank journal is made large with respect to the cross-sectional area of the case when viewed in the axial direction of the case. In other words, by thickening the crankshaft in terms of a balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, each of the plurality of crankshafts includes a crank journal having a diameter dc2, and $5.0 \leq D1/dc2 \leq 6.5$ may be satisfied.

In the speed reducer according to the aspect of the invention, the cross-sectional area of the crank journal is made large with respect to the cross-sectional area of the case when viewed in the axial direction of the case. In other words, by thickening the crankshaft in terms of a balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

In the speed reducer according to the aspect, each of the plurality of crankshafts may include a crank journal having a diameter dc2, and $2.5 \leq D2/dc2 \leq 3.5$ may be satisfied.

In the speed reducer according to the aspect of the invention, the cross-sectional area of the crank journal is made large with respect to the cross-sectional area of the case when viewed in the axial direction of the case. Accordingly the crankshaft is situated away from the central axis of the reducer. In other words, by thickening and disposing the crankshaft at an outward position in the reducer in terms of the balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

A speed reducer according to another aspect of the invention includes: a case with internal teeth, the case having an outer diameter D; and a plurality of crankshafts arranged on a circumference of an imaginary circle that has a diameter D2 and is centered on a central axis of the case, the crankshafts being spaced away from each other in a circumferential direction of the imaginary circle. The crankshaft includes a crank journal having a diameter dc2, and a plurality of needles arranged around the crank journal. Each of the needles has a diameter size dr2. In the speed reducer, $6.0 \leq dc2/dr2 \leq 9.0$ is satisfied.

In the speed reducer according to the aspect of the invention, the cross-sectional area of the crank journal is made large with respect to the cross-sectional area of the case when viewed in the axial direction of the case. In other words, by thickening the crankshaft in terms of a balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

A speed reducer according to another aspect of the invention includes: a case with internal teeth, the case having an outer diameter D; and a plurality of crankshafts arranged on a circumference of an imaginary circle that has a diameter D2 and is centered on a central axis of the case, the crankshafts being spaced away from each other in a circumferential direction of the imaginary circle. The crankshaft includes an eccentric member having a diameter dc1, and a crank journal having a diameter dc2. In the speed reducer, $0.85 \leq dc2/dc1 \leq 1.0$ is satisfied.

In the speed reducer according to the aspect of the invention, the cross-sectional areas of the eccentric member of the crank and the crank journal are made large with respect to the cross-sectional area of the case. In other words, by thickening the crankshaft in terms of a balance of the reducer, the number of needles arranged around the eccentric member and the crank journal can be increased. Moreover, the thickness of each needle is set in an appropriate range, and the number of contacts between the eccentric member and the needles and between the crank journal and the needles are increased so that the load applied to each needle can be reduced. Thereby the damping capability of the speed reducer can be improved. Further, the rigidity can be improved by reducing the variation in the loads applied to the plurality of needles and making the crankshaft thicker at the same time. Further, the damping capability can be improved by setting the thicknesses of the eccentric member, the crank journal, and the needle in an appropriate range. Thus, in this speed reducer, the crankshaft is made thicker and a large number of small-diameter needles are arranged around the bearing to increase the number of physical contacts between them, which improves the rigidity and damping capability of the reducer.

A speed reducer according to another aspect of the invention includes: a case with internal teeth, the case having an outer diameter D; and a plurality of crankshafts arranged on a circumference of an imaginary circle that has a diameter D2 and is centered on a central axis of the case, the crankshafts being spaced away from each other in a circumferential direction of the imaginary circle. The crankshaft includes an eccentric member having a diameter $dc1$, and $n1$ needles that are arranged around each of the plurality of eccentric members and each of which has a diameter size $dr1$. In the speed reducer, $0.7 \leq n1 \cdot dr1/\pi(dc1+dr1) \leq 0.9$ is satisfied.

In the speed reducer according to the aspect of the invention, the cross-sectional area of the eccentric member of the crank is made large with respect to the cross-sectional area of the case. In other words, by thickening the crankshaft in terms of a balance of the reducer, the number of needles arranged around the eccentric member can be increased. Moreover, the thickness of each needle and the number of the needles provided are set in a respective appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

A speed reducer according to another aspect of the invention includes: a case with internal teeth, the case having an outer diameter D; and a plurality of crankshafts arranged on a circumference of an imaginary circle that has a diameter D2 and is centered on a central axis of the case, the crankshafts being spaced away from each other in a circumferential direction of the imaginary circle. The crankshaft includes an eccentric member having a diameter $dc1$, and $n1$ needles that are arranged around each of the plurality of eccentric members and each of which has a diameter size $dr1$. In the speed reducer, $15.3 \leq n1 \leq 28.3$ is satisfied.

In the speed reducer according to the aspect, the number of the needles provided around the eccentric member of the crank is set in an appropriate range, and the number of contacts between the eccentric member and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

A speed reducer according to another aspect of the invention includes: a case with internal teeth, the case having an outer diameter D; and a plurality of crankshafts arranged on a circumference of an imaginary circle that has a diameter D2 and is centered on a central axis of the case, the crankshafts being spaced away from each other in a circumferential direction of the imaginary circle. The crankshaft includes a crank journal having a diameter $dc2$, and $n2$ needles arranged around the crank journal. Each of the needles has a diameter size $dr2$. In the speed reducer, $0.7 \leq n2 \cdot dr2/\pi(dc2+dr2) \leq 0.9$ is satisfied.

In the speed reducer according to the aspect of the invention, the cross-sectional area of the crank journal is made large with respect to the cross-sectional area of the case. In other words, by thickening the crankshaft in terms of a balance of the reducer, the number of needles arranged around the crank journal can be increased. Moreover, the thickness of each needle is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

A speed reducer according to another aspect of the invention includes: a case with internal teeth, the case having an outer diameter D; and a plurality of crankshafts arranged on a circumference of an imaginary circle that has a diameter D2 and is centered on a central axis of the case, the crankshafts being spaced away from each other in a circumferential direction of the imaginary circle. The crankshaft includes a crank journal having a diameter $dc2$, and $n2$ needles that are arranged around the crank journal and each of which has a diameter size $dr2$. In the speed reducer, $15.3 \leq n2 \leq 28.3$ is satisfied.

In the speed reducer according to the aspect, the number of the needles provided around the crank journal is set in an appropriate range, and the number of contacts between the crank journal and the needles is increased so that the load applied to each needle can be reduced. Thereby the damping capability of the speed reducer can be improved. Further, the rigidity can be improved by reducing the variation in the loads applied to the plurality of needles and making the crankshaft thicker at the same time. Thus, in this speed reducer, the crankshaft is made thicker and a large number of small-diameter needles are arranged around the bearing to increase the number of physical contacts between them, which improves the rigidity and damping capability of the reducer.

According to the aspects of the invention, it is possible to obtain a speed reducer with a high rigidity and damping capability.

DESCRIPTION OF THE EMBODIMENTS

Figure 1:
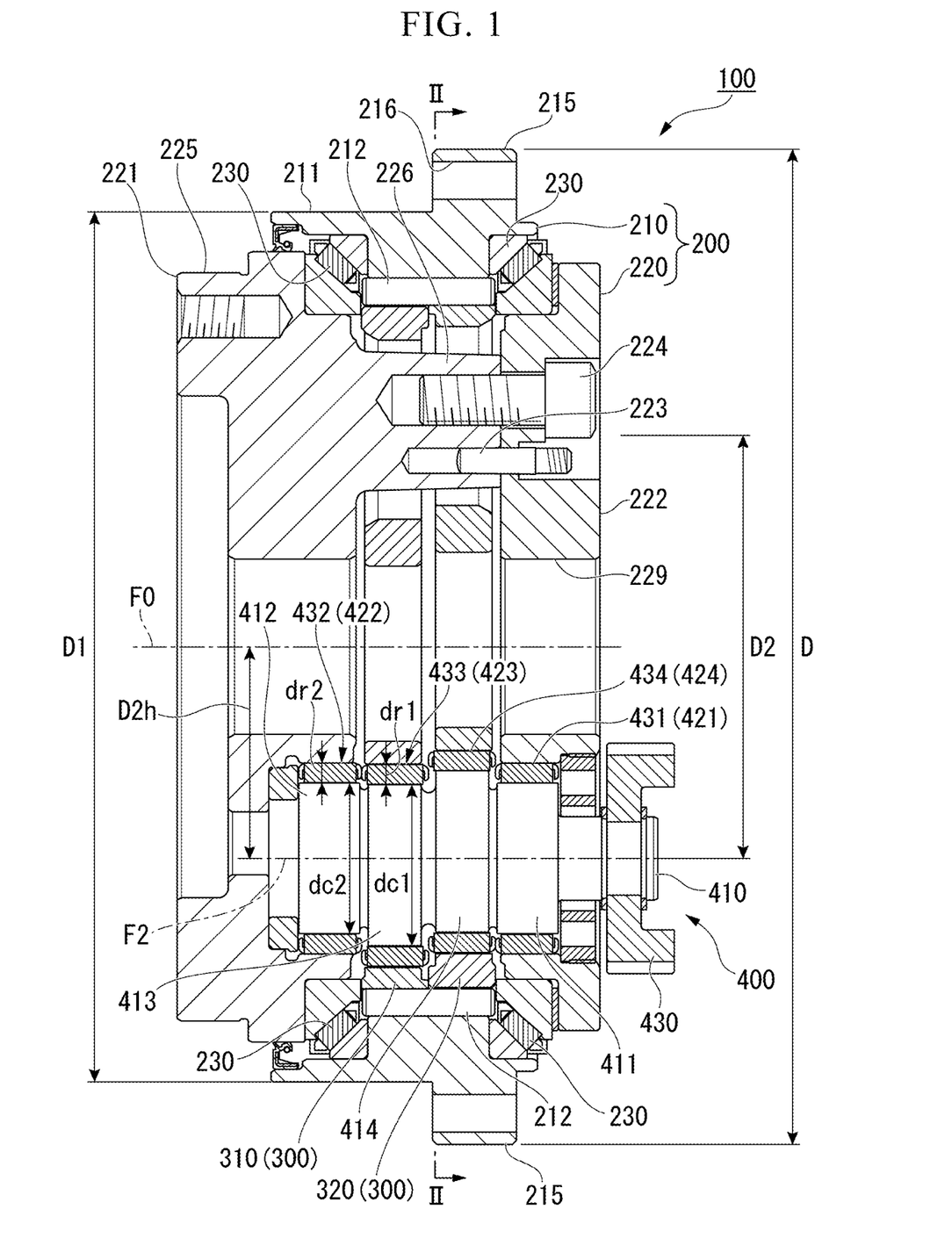
FIG. 1 is a sectional view of a speed reducer relating to an embodiment of the invention along a crankshaft axis.
Figure 2:
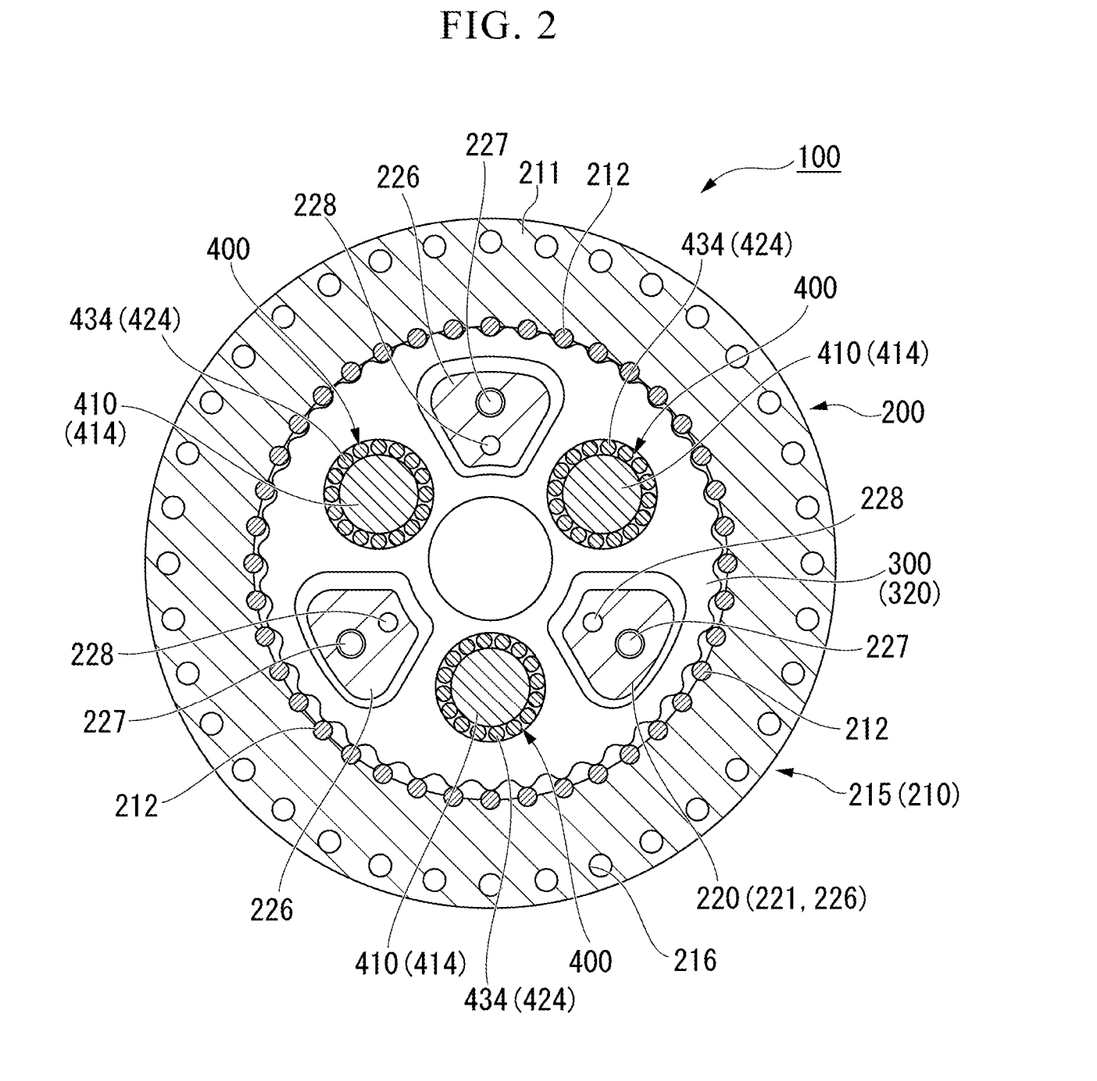
FIG. 2 is a sectional view along the line II-II in FIG. 1.

A speed reducer relating to an embodiment of the invention will be described with reference to the accompanying drawings. FIG. 1 is a sectional view of a speed reducer according to the embodiment of the invention, and FIG. 2 is a sectional view along the line II-II in FIG. 1. In FIG. 1, a reference number 100 refers to the speed reducer.

The speed reducer 100 according to the embodiment of the invention includes a cylindrical housing 200, a gear unit (an external-tooth member) 300, and three crank assemblies 400, as shown in FIGS. 1 and 2. The cylindrical housing 200 houses therein the gear unit 300 and three crank assemblies 400. In the embodiment, the speed reducer 100 may be an eccentric oscillating speed reducer.

The cylindrical housing 200 includes an outer cylindrical portion (case) 210, a carrier portion (carrier) 220, and two main bearings 230. The outer cylindrical portion 210 has internal teeth. The outer cylindrical portion 210 has an outer diameter D. The outer cylinder portion 210 is formed in a cylindrical shape having the outer diameter D1. The carrier portion 220 is disposed inside the outer cylindrical portion 210. The carrier portion 220 supports a plurality of crankshafts 410 (described below) in a rotatable manner and is rotated by the crankshafts 410 relative to the outer cylindrical portion 210. The crankshafts 410 are configured to oscillate the gear unit 300.

The two main bearings 230 are each arranged between the outer cylindrical portion 210 and the carrier portion 220. The two main bearings 230 allow the relative rotation of the outer cylindrical portion 210 and the carrier portion 220. In this embodiment, one of the outer cylindrical portion 210 and the carrier portion 220 represents the output unit of the speed reducer 100, for example.

In the speed reducer 100 relating to the present embodiment, each of the crankshafts 410 is provided in one of the crank assemblies 400. The crankshafts 410 are arranged on the circumference of the imaginary circle, which is centered around the central axis F0 of the outer cylindrical portion 210 (the arrangement circle on which the crankshafts 410 can be arranged), and spaced away from each other in the circumferential direction of the imaginary circle. The crankshafts 410 each have first outer teeth. Here, the imaginary circle denotes the circle having a diameter identified by the reference numeral D2 in FIG. 1.

The gears (gears 310, 320 described later) in the gear unit 300 each have second external teeth that mesh with the internal teeth of the outer cylindrical portion 210. The second external teeth of the gear unit 300 are different from the first external teeth of the crankshafts 410. The gear unit 300 is oscillated by the crankshafts 410 and eccentrically moved by the rotation of the crankshafts 410.

FIG. 1 shows the central axis (main axis) F0 of the speed reducer 100, which is defined as the axis of rotation for the two main bearings 230. When the outer cylindrical portion 210 is stationary, the carrier portion 220 rotates about the main axis F0. When the carrier portion 220 is stationary, the outer cylindrical portion 210 rotates about the main axis F0. In other words, one of the outer cylindrical portion 210 and the carrier portion 220 can rotate relative to the other around the main axis F0.

An attachment flange 215 is provided on the outer circumferential surface of the outer cylindrical portion 210 such that it surrounds the cylindrical portion 210. The attachment flange 215 has a plurality of attachment holes 216 that are formed in the peripheral edge of the flange and arranged spaced apart from each other. The attachment flange 215 may be used as a spigot joint portion to mount the speed reducer 100, for example.

The outer cylindrical portion 210 includes an outer cylinder 211 and a plurality of internal tooth pins (internal teeth) 212. The outer cylinder 211 forms a cylindrical internal space in which the carrier portion 220, gear unit 300 and crank assemblies 400 are housed. The internal tooth pins 212 are columnar members extending substantially parallel to the main axis F0. The internal tooth pins 212 are fitted in grooves formed in the inner wall of the outer cylinder 211. Therefore, the internal tooth pins 212 are appropriately retained by the outer cylinder 211.

The plurality of internal tooth pins 212 are arranged at substantially regular intervals around the rotation axis F0. Each internal tooth pin 212 has a semicircle surface projecting from the inner wall of the outer cylinder 211 toward the main axis F0. Therefore, the plurality of internal tooth pins 212 serve as internal teeth meshing with the gear unit 300.

The carrier portion 220 includes a base portion 221, an end plate portion 222, a positioning pin 223 and a fixing bolt 224. The carrier portion 220 as a whole has a cylindrical shape. The carrier portion 220 has a through hole 229 formed therein, which is centered around the main axis F0. The base portion 221 includes a base plate portion 225 and three shaft portions 226. Each of the three shaft portions 226 extends from the base plate portion 225 toward the end plate portion 222. The end surface of each of the three shaft portions 226, which faces away from the base plate portion 225, has a screw hole 227 and a reaming hole 228 formed therein. The positioning pin 223 is inserted into the reaming hole 228. This in turn accurately positions the end plate portion 222 relative to the base portion 221. The fixing bolt 224 is screwed into the screw hole 227. This in turn appropriately secures the end plate portion 222 to the base portion 221.

The gear unit 300 is disposed between the base plate portion 225 and the end plate portion 222. The three shaft portions 226 extend through the gear unit 300 and are connected to the end plate portion 222.

The gear unit 300 includes two gears 310 and 320. The gear 310 is disposed between the base plate portion 225 and the gear 320. The gear 320 is disposed between the end plate portion 222 and the gear 310.

The gear 310 is substantially equal in shape and size to each of the gear 320. The gears 310 and 320 performs revolution movement within the outer cylinder 211 while being meshed with the internal tooth pins 212. Accordingly, the respective centers of the gears 310 and 320 revolve about the main axis F0.

The phase of the revolution performed by the gear 310 is off by substantially 180° the phase of the revolution performed by the gear 320. While the gear 310 meshes with half of the internal tooth pins 212 of the outer cylindrical portion 210, the gear 320 meshes with the remaining half of the internal tooth pins 212. In this way, the gear unit 300 can rotate one of the outer cylindrical portion 210 and the carrier portion 220.

In the present embodiment, the gear unit 300 includes the two gears 310 and 320. Two or more gears may be used for the gear unit. As another alternative example, the gear unit 300 may use a single gear.

Each of the three crank assemblies 400 includes a crankshaft 410, four bearings 421, 422, 423 and 424 and a transmission gear (external teeth) 430. It may also be possible that the transmission gear 430 is formed of a spur gear in general use. In the speed reducer 100 relating to the present embodiment, the transmission gear 430 is not limited to any particular type.

The transmission gear 430 directly or indirectly receives the driving force generated by a driving source (for example, a motor). The drive force transmission path from the driving source to the transmission gear 430 can be appropriately designed depending on the environment in which the speed reducer 100 is used and/or requirements for the speed reducer 100. Accordingly, the present embodiment is not limited to any particular transmission path for the driving force transmitting from the driving source to the transmission gear 430.

FIG. 1 shows a crankshaft axial line (transmission axis) F2. The transmission axis F2 is substantially parallel to the main axis F0. The crankshaft 410 rotates about the transmission axis F2. In FIG. 1, the distance between the transmission axis F2 and the main axis F0 is indicated by the symbol "D2h".

The crankshaft 410 includes two journals (crank journals) 411,412 and two eccentric portions (eccentric members) 413,414. The journals 411,412 extend along the transmission axis F2. The central axis of the journals 411,412 coincides with the transmission axis F2. The eccentric portions 413,414 are formed between the journals 411 and 412. Each of the eccentric portions 413 and 414 is eccentrically arranged with respect to the transmission axis F2.

The eccentric portions 413 and 414 are disposed at positions corresponding to the gears 310 and 320, respectively. The eccentric portions 413 and 414 each have a diameter dc1. The journals 411 and 412 are disposed at positions corresponding to the base portion 221 (carrier portion 220) and the end plate portion 222 (carrier portion 220) respectively. The journals 411 and 4124 each have a diameter dc2.

The journal 411 is inserted into the bearing 421. The bearing 421 is arranged between the journal 411 and the end plate portion 222. Accordingly, the journal 411 is retained by the end plate portion 222 and the bearing 421. The journal 412 is inserted into the bearing 422. The bearing 422 is arranged between the journal 412 and the base portion 221. Accordingly, the journal 412 is retained by the base portion 221 and the bearing 422. In the present embodiment, the bearing 421 is a needle bearing such that a plurality of needles 431 are arranged around the journal 411. The bearing 422 is a needle bearing such that a plurality of needles 432 are arranged around the journal 412.

The needles 431 and 432 correspond to second needles arranged around the journals 411 and 412 respectively. Each of the needles 431 and 432 has a diameter dr2. The number of the needles 431 is n2 and the number of the needles 432 is also n2.

The eccentric portion 413 is inserted into the bearing 423. The bearing 423 is disposed between the eccentric portion 413 and the gear 310. The eccentric portion 414 is inserted into the bearing 424. The bearing 424 is disposed between the eccentric portion 414 and the gear 320. In the present embodiment, the bearing 423 is a needle bearing such that a plurality of needles 433 are arranged around the eccentric portion 413. The bearing 424 is a needle bearing such that a plurality of needles 434 are arranged around the eccentric portion 414.

The needles 433 and 434 correspond to first needles arranged around the eccentric members 413 and 414 respectively. Each of the needles 433 and 434 has a diameter dr1. The number of the needles 433 is n1 and the number of the needles 434 is also n1.

As driving force is input into the transmission gear 430, the crankshaft 410 rotates about the transmission axis F2. This in turn causes the eccentric portions 413, 414 to eccentrically rotate about the transmission axis F2. The gears 310, 320, which are connected to the eccentric portions 413, 414 via the bearings 423, 424, resultantly oscillate within the circular space defined by the outer cylindrical portion 210. As the gears 310, 320 mesh with the internal tooth pins 212, relative rotation between the outer cylindrical portion 210 and the carrier portion 220 is caused.

The parts and components of the speed reducer 100 relating to the present embodiment are defined as follows in terms of their dimensions and dimensional relations among them.

D: The outer diameter of the attachment flange 215

D1: The outer diameter of the outer cylindrical portion (case) 210

D2: The diameter of the circle that is concentrically arranged with the main axis F0 and has a radius of D2h, the crankshaft axial line (transmission axis) F2 is disposed on the circle dc1: The diameter of the eccentric portions 413 and 414 dc2: The diameter of the journals 411 and 412 dr1: The diameter of the needles 433 and 434 around the eccentric portions 413 and 414 dr2: The diameter of the needles 431 and 432 around the journals 411 and 412

$$5.5 \leq D/dc1 \leq 7.0 \quad \text{(Formula 1)}$$

When Formula 1 is satisfied, the crankshaft 410 is made thick with respect to the outermost diameter of the case 210. This means that the crankshaft 410 is made thicker than one in a conventional speed reducer to improve the rigidity of the crankshaft 410. At the same time, by increasing the diameter dc1 of the eccentric portions 413 and 414 and decreasing the needle diameter dr1, the number n1 of the needles 433 and 434 arranged around the eccentric portions 413 and 414 respectively is increased. Here, the diameter of the crankshaft 410 can be set with an appropriate size ratio relative to the size of the speed reducer 100 so that the crankshaft well fits in the reducer.

Further, the number of line contacts between the needles 433 and the eccentric portion 413 can be increased when the above formula is satisfied. It is possible to improve the rigidity by increasing the number of contacts between the needles 433 and the eccentric portion 413. Moreover, it is possible to reduce the unevenness of the loads that the needles 433 each receive from the eccentric portion 413 and thereby prevent a large reduction in the damping ability of the bearing 423. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr1 becomes too small to maintain a sufficient durability, which is undesirable.

Similarly, the number of line contacts between the needles 434 and the eccentric portion 414 can be increased when the above formula is satisfied. It is possible to improve the rigidity by increasing the number of contacts between the needles 434 and the eccentric portion 414. Moreover, it is possible to reduce the unevenness of the loads that the needles 434 each receive from the eccentric portion 414 and thereby prevent a large reduction in the damping ability of the bearing 424. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr1 becomes too small to maintain a sufficient durability, which is undesirable.

$$4.5 \leq D1/dc1 \leq 6.0 \quad \text{(Formula 2)}$$

When Formula 2 is satisfied, the crankshaft 410 is made thick with respect to the size of the case 210. This means that the crankshaft 410 is made thicker than one in the conventionally used speed reducer to improve the rigidity of the crankshaft 410. At the same time, by increasing the diameter dc1 of the eccentric portions 413 and 414 and decreasing the needle diameter dr1, the number n1 of the needles 433 and 434 arranged around the eccentric portions 413 and 414 respectively is increased.

Further, the number of line contacts between the needles 433 and the eccentric portion 413 can be increased when the above formula is satisfied. It is possible to improve the rigidity by increasing the number of contacts between the needles 433 and the eccentric portion 413. Moreover, it is possible to reduce the unevenness of the loads that the needles 433 each receive from the eccentric portion 413 and thereby prevent a large reduction in the damping ability of the bearing 423. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr1 becomes too small to maintain a sufficient durability, which is undesirable.

Similarly, the number of line contacts between the needles 434 and the eccentric portion 414 can be increased when the above formula is satisfied. It is possible to improve the rigidity by increasing the number of contacts between the needles 434 and the eccentric portion 414. Moreover, it is possible to reduce the unevenness of the loads that the needles 434 each receive from the eccentric portion 414 and thereby prevent a large reduction in the damping ability of the bearing 424. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr1 becomes too small to maintain a sufficient durability, which is undesirable.

$$2.0 \leq D2/dc1 \leq 3.0 \quad \text{(Formula 3)}$$

When Formula 3 is satisfied, the crankshaft 410 is made thick with respect to the size of the case 210. Formula 3 is set in consideration of the arrangement of the components. Specifically, the crankshaft 410 is made thicker than one in the conventionally used speed reducer to improve the rigidity of the crankshaft 410. At the same time, by increasing the diameter dc1 of the eccentric portions 413 and 414 and decreasing the needle diameter dr1, the number n1 of the needles 433 and 434 arranged around the eccentric portions 413 and 414 respectively is increased. Further, according to the formula, the crankshaft 410, the needles 433, 434 and the carrier 220 are not made smaller than necessary, and the rigidity thereof can be maintained.

Further, the number of line contacts between the needles 433 and the eccentric portion 413 can be increased when the above formula is satisfied. It is possible to improve the rigidity by increasing the number of contacts between the needles 433 and the eccentric portion 413. Moreover, it is possible to reduce the unevenness of the loads that the needles 433 each receive from the eccentric portion 413 and thereby prevent a large reduction in the damping ability of the bearing 423. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr1 becomes too small to maintain a sufficient durability, which is undesirable.

Similarly, the number of line contacts between the needles 434 and the eccentric portion 414 can be increased when the above formula is satisfied. It is possible to improve the rigidity by increasing the number of contacts between the needles 434 and the eccentric portion 414. Moreover, it is possible to reduce the unevenness of the loads that the needles 434 each receive from the eccentric portion 414 and thereby prevent a large reduction in the damping ability of the bearing 424. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr1 becomes too small to maintain a sufficient durability, which is undesirable.

$$6.0 \leq dc1/dr1 \leq 9.0 \quad \text{(Formula 4)}$$

When Formula 4 is satisfied, the crankshaft 410 is made thick with respect to the size of the case 210. Formula 3 is set in consideration of the arrangement of the components. Specifically, the crankshaft 410 is made thicker to improve the rigidity of the crankshaft 410. At the same time, the thickness of the needles 433 and 434 arranged around the eccentric portions 413 and 414 is set within a predetermined range with respect to the diameter dc1 of the eccentric portions 413 and 414. In this way, the number n1 of the needles 433 and 434 is increased relative to conventional speed reducers. Further, according to the formula, the crankshaft 410, the needles 433, 434 and the carrier 220 are not made smaller than necessary, and the rigidity thereof can be maintained.

Further, the number of line contacts between the needles 433 and the eccentric portion 413 can be increased when the above formula is satisfied. It is possible to improve the rigidity by increasing the number of contacts between the needles 433 and the eccentric portion 413. Moreover, it is possible to reduce the unevenness of the loads that the needles 433 each receive from the eccentric portion 413 and thereby prevent a large reduction in the damping ability of the bearing 423. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr1 becomes too small to maintain a sufficient durability, which is undesirable.

Similarly, the number of line contacts between the needles 434 and the eccentric portion 414 can be increased when the above formula is satisfied. It is possible to improve the rigidity by increasing the number of contacts between the needles 434 and the eccentric portion 414. Moreover, it is possible to reduce the unevenness of the loads that the needles 434 each receive from the eccentric portion 414 and thereby prevent a large reduction in the damping ability of the bearing 424. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr1 becomes too small to maintain a sufficient durability, which is undesirable.

$$6.0 \le D/dc2 \le 7.5 \qquad \text{(Formula 5)}$$

When Formula 5 is satisfied, the crankshaft 410 is made thick with respect to the outermost diameter of the case 210. Specifically, the crankshaft 410 is made thicker than one in the conventionally used speed reducer to improve the rigidity of the crankshaft 410. At the same time, by increasing the diameter dc2 of the journals 411 and 412 and decreasing the needle diameter dr2, the number n2 of the needles 431 and 432 arranged around the journals 411 and 412 respectively is increased. Here, the diameter of the crankshaft 410 can be set based on an appropriate ratio to the size of the speed reducer 100 so that the crankshaft well fits in the reducer.

Accordingly, the number of line contacts between the needles 431 and the journal 411 can be increased when the above formula is satisfied. It is possible to improve the rigidity by increasing the number of contacts between the needles 431 and the journal 411. Moreover, it is possible to reduce the unevenness of the loads that the needles 431 each receive from the journal 411 and thereby prevent a large reduction in the damping ability of the bearing 421. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr2 becomes too small to maintain a sufficient durability, which is undesirable.

Similarly, the number of line contacts between the needles 432 and the journal 412 can be increased when the above formula is satisfied. It is possible to improve the rigidity by increasing the number of contacts between the needles 432 and the journal 412. Moreover, it is possible to reduce the unevenness of the loads that the needles 432 each receive from the journal 412 and thereby prevent a large reduction in the damping ability of the bearing 422. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr2 becomes too small to maintain a sufficient durability, which is undesirable.

$$5.0 \le D1/dc2 \le 6.5 \qquad \text{(Formula 6)}$$

When Formula 6 is satisfied, the crankshaft 410 is made thick with respect to the size of the case 210. Specifically, the crankshaft 410 is made thicker than one in the conventionally used speed reducer to improve the rigidity of the crankshaft 410. At the same time, by increasing the diameter dc2 of the journals 411 and 412 and decreasing the needle diameter dr2, the number n2 of the needles 431 and 432 arranged around the journals 411 and 412 respectively is increased.

Accordingly, the number of line contacts between the needles 431 and the journal 411 can be increased when the above formula is satisfied. It is possible to improve the rigidity by increasing the number of contacts between the needles 431 and the journal 411. Moreover, it is possible to reduce the unevenness of the loads that the needles 431 each receive from the journal 411 and thereby prevent a large reduction in the damping ability of the bearing 421. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr2 becomes too small to maintain a sufficient durability, which is undesirable.

Similarly, the number of line contacts between the needles 432 and the journal 412 can be increased when the above formula is satisfied. It is possible to improve the rigidity by increasing the number of contacts between the needles 432 and the journal 412. Moreover, it is possible to reduce the unevenness of the loads that the needles 432 each receive from the journal 412 and thereby prevent a large reduction in the damping ability of the bearing 422. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr2 becomes too small to maintain a sufficient durability, which is undesirable.

$$2.5 \le D2/dc2 \le 3.5 \qquad \text{(Formula 7)}$$

When Formula 7 is satisfied, the crankshaft 410 is made thick with respect to the size of the case 210. Formula 3 is set in consideration of the arrangement of the components. Specifically, the crankshaft 410 is made thicker than one in the conventionally used speed reducer to improve the rigidity of the crankshaft 410. At the same time, by increasing the diameter dc2 of the journals 411 and 412 and decreasing the needle diameter dr2, the number n2 of the needles 431 and 432 arranged around the journals 411 and 412 respectively is increased. Further, according to the formula, the crankshaft 410, the needles 431, 432 and the carrier 220 are not made smaller than necessary, and the rigidity thereof can be maintained.

Accordingly, the number of line contacts between the needles 431 and the journal 411 can be increased when the above formula is satisfied. It is possible to improve the rigidity by increasing the number of contacts between the needles 431 and the journal 411. Moreover, it is possible to reduce the unevenness of the loads that the needles 431 each receive from the journal 411 and thereby prevent a large reduction in the damping ability of the bearing 421. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr2 becomes too small to maintain a sufficient durability, which is undesirable.

Similarly, the number of line contacts between the needles 432 and the journal 412 can be increased when the above formula is satisfied. It is possible to improve the rigidity by increasing the number of contacts between the needles 432 and the journal 412. Moreover, it is possible to reduce the unevenness of the loads that the needles 432 each receive from the journal 412 and thereby prevent a large reduction in the damping ability of the bearing 422. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr2 becomes too small to maintain a sufficient durability, which is undesirable.

$$6.0 \leq dc2/dr2 \leq 9.0 \quad \text{(Formula 8)}$$

When Formula 8 is satisfied, the crankshaft 410 is made thick with respect to the size of the case 210. Formula 3 is set in consideration of the arrangement of the components. Specifically, the crankshaft 410 is made thicker to improve the rigidity of the crankshaft 410. At the same time, the thickness of the needles 431 and 432 arranged around the journals 411 and 412 is set within a predetermined range with respect to the diameter dc2 of the journals 411 and 412. In this way, the number n2 of the needles 431 and 432 is increased relative to conventional speed reducers. Further, according to the formula, the crankshaft 410, the needles 431, 432 and the carrier 220 are not made smaller than necessary, and the rigidity thereof can be maintained.

Accordingly, the number of line contacts between the needles 431 and the journal 411 can be increased when the above formula is satisfied. It is possible to improve the rigidity by increasing the number of contacts between the needles 431 and the journal 411. Moreover, it is possible to reduce the unevenness of the loads that the needles 431 each receive from the journal 411 and thereby prevent a large reduction in the damping ability of the bearing 421. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr2 becomes too small to maintain a sufficient durability, which is undesirable.

Similarly, the number of line contacts between the needles 432 and the journal 412 can be increased when the above formula is satisfied. It is possible to improve the rigidity by increasing the number of contacts between the needles 432 and the journal 412. Moreover, it is possible to reduce the unevenness of the loads that the needles 432 each receive from the journal 412 and thereby prevent a large reduction in the damping ability of the bearing 422. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, and the needle diameter dr2 becomes too small to maintain a sufficient durability, which is undesirable.

$$0.85 \leq dc2/dc1 \leq 1.0 \quad \text{(Formula 9)}$$

When Formula 9 is satisfied, the crankshaft 410 is made thick with respect to the size of the case 210. Formula 3 is set in consideration of their arrangement. Specifically, the crankshaft 410 is made thicker to improve the rigidity of the crankshaft 410. At the same time, the balance between the thickness of the eccentric portions 413 and 414 and the thickness of the journals 411 and 412 is adjusted to optimize the load balance on the crankshaft 410. Further, the relationship between the number and thickness of the needles 433, 434 and the number and thickness of the needles 431, 432 arranged around the eccentric portions 413, 414 and the journals 411, 412 respectively is set in a predetermined range. In this way, the number n2 of the needles 431, 432 and the number n2 of the needles 431, 432 are increased relative to conventional speed reducers and made appropriate. Further, according to the formula, the crankshaft 410 and the needles 431 to 434 are not made smaller than necessary, and the rigidity thereof can be maintained.

$$0.7 \leq n1 \cdot dr1/\pi(dc1+dr1) \leq 0.9 \quad \text{(Formula 10)}$$

When Formula 10 is satisfied, the ratio of the circumferential length occupied by the number n1 of the needles 433, 434 to the circumferential length of the eccentric portions 413, 414, that is, the occupancy of the needles 433, 434 in the eccentric portions 413, 414 respectively can be set within a predetermined range. Thus, the crankshaft 410 is made thick with respect to the size of the case 210 and Formula 10 is set in consideration of their arrangement. Specifically, the crankshaft 410 is made thicker to improve the rigidity of the crankshaft 410. At the same time, the thickness of the needles 433 and 434 arranged around the eccentric portions 413 and 414 is set within a predetermined range with respect to the thickness of the eccentric portions 413 and 414. In this way, the number n1 of the needles 433 and 434 is increased relative to conventional speed reducers. Further, according to the formula, the crankshaft 410 and the needles 433, 434 are not made smaller than necessary, the carrier 220 is not made too thin, and the rigidity thereof can be maintained.

Further, the number of line contacts between the needles 433 and the eccentric portion 413 can be increased when the above formula is satisfied. It is possible to improve the rigidity by increasing the number of contacts between the needles 433 and the eccentric portion 413. Moreover, it is possible to reduce the unevenness of the loads that the needles 433 each receive from the eccentric portion 413 and thereby prevent a large reduction in the damping ability of the bearing 423. Further, by setting the parameter in the above range of Formula 1, the torsional rigidity can be improved as compared with the case where the parameter is set in a range smaller than the above range. If the formula has a larger range than the above range, the retaining strength of the bearing cannot be secured, which is undesirable.

Similarly, the number of line contacts between the needles 434 and the eccentric portion 414 can be increased when the above formula is satisfied. It is possible to improve the rigidity by increasing the number of contacts between the needles 434 and the eccentric portion 414. Moreover, it is possible to reduce the unevenness of the loads that the needles 434 each receive from the eccentric portion 414 and thereby prevent a large reduction in the damping ability of the bearing 424. Further, by setting the parameter in the above range of Formula 1, the torsional rigidity can be improved as compared with the case where the parameter is set in a range smaller than the above range. If the formula has a larger range than the above range, the retaining strength of the bearing cannot be secured, which is undesirable.

$$15.3 \leq n1 \leq 28.3 \qquad \text{(Formula 11)}$$

When Formula 11 is satisfied, the occupancy of the needles 433 and 434 in the eccentric portions 413 and 414 can be set as the number n1 in a predetermined range. Thus, the crankshaft 410 is made thick with respect to the size of the case 210, and Formula 11 is set in consideration of their arrangement. Specifically, the crankshaft 410 is made thicker to improve the rigidity of the crankshaft 410. At the same time, the thickness of the needles 433 and 434 arranged around the eccentric portions 413 and 414 is set within a predetermined range with respect to the thickness of the eccentric portions 413 and 414. In this way, the number n1 of the needles 433 and 434 is increased relative to conventional speed reducers. Further, according to the formula, the crankshaft 410 and the needles 433, 434 are not made smaller than necessary, the carrier 220 is not made too thin, and the rigidity thereof can be maintained.

Further, the number of line contacts between the needles 433 and the eccentric portion 413 can be increased when the above formula is satisfied. It is possible to improve the rigidity by increasing the number of contacts between the needles 433 and the eccentric portion 413. Moreover, it is possible to reduce the unevenness of the loads that the needles 433 each receive from the eccentric portion 413 and thereby prevent a large reduction in the damping ability of the bearing 423. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, which is undesirable.

Similarly, the number of line contacts between the needles 434 and the eccentric portion 414 can be increased when the above formula is satisfied. It is possible to improve the rigidity by increasing the number of contacts between the needles 434 and the eccentric portion 414. Moreover, it is possible to reduce the unevenness of the loads that the needles 434 each receive from the eccentric portion 414 and thereby prevent a large reduction in the damping ability of the bearing 424. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, which is undesirable.

$$0.7 \leq n2 \cdot dr2/\pi(dc2+dr2) \leq 0.9 \qquad \text{(Formula 12)}$$

When Formula 12 is satisfied, the ratio of the circumferential length occupied by the number n2 of the needles 431, 432 to the circumferential length of the journals 411, 412, that is, the occupancy of the needles 431, 432 in the journals 411, 412 respectively can be set within a predetermined range. Thus, the crankshaft 410 is made thick with respect to the size of the case 210, and Formula 12 is set in consideration of their arrangement. Specifically, the crankshaft 410 is made thicker to improve the rigidity of the crankshaft 410. At the same time, the thickness of the needles 431 and 432 arranged around the journals 411 and 412 is set within a predetermined range with respect to the thickness of the journals 411 and 412. In this way, the number n2 of the needles 431 and 432 is increased relative to conventional speed reducers. Further, according to the formula, the crankshaft 410 and the needles 431, 432 are not made smaller than necessary, the carrier 220 is not made too thin, and the rigidity thereof can be maintained.

Accordingly, the number of line contacts between the needles 431 and the journal 411 can be increased when the above formula is satisfied. It is possible to improve the rigidity by increasing the number of contacts between the needles 431 and the journal 411. Moreover, it is possible to reduce the unevenness of the loads that the needles 431 each receive from the journal 411 and thereby prevent a large reduction in the damping ability of the bearing 421. Further, by setting the parameter in the above range of Formula 1, the torsional rigidity can be improved as compared with the case where the parameter is set in a range smaller than the above range. If the formula has a larger range than the above range, the retaining strength of the bearing cannot be secured, which is undesirable.

Similarly, the number of line contacts between the needles 432 and the journal 412 can be increased when the above formula is satisfied. It is possible to improve the rigidity by increasing the number of contacts between the needles 432 and the journal 412. Moreover, it is possible to reduce the unevenness of the loads that the needles 432 each receive from the journal 412 and thereby prevent a large reduction in the damping ability of the bearing 422. Further, by setting the parameter in the above range of Formula 1, the torsional rigidity can be improved as compared with the case where the parameter is set in a range smaller than the above range. If the formula has a larger range than the above range, the retaining strength of the bearing cannot be secured, which is undesirable.

$$15.3 \leq n2 \leq 28.3 \qquad \text{(Formula 13)}$$

When Formula 13 is satisfied, the occupancy of the needles 431 and 432 in the journals 411 and 412 can be set as the number n2 in a predetermined range. Thus, the crankshaft 410 is made thick with respect to the size of the case 210, and Formula 13 is set in consideration of their arrangement. Specifically, the crankshaft 410 is made thicker to improve the rigidity of the crankshaft 410. At the same time, the thickness of the needles 431 and 432 arranged around the journals 411 and 412 is set within a predetermined range with respect to the thickness of the journals 411 and 412. In this way, the number n2 of the needles 431 and 432 is increased relative to conventional speed reducers. Further, according to the formula, the crankshaft 410 and the needles 431, 432 are not made smaller than necessary, the carrier 220 is not made too thin, and the rigidity thereof can be maintained.

Accordingly, the number of line contacts between the needles 431 and the journal 411 can be increased when the above formula is satisfied. It is possible to improve the rigidity by increasing the number of contacts between the needles 431 and the journal 411. Moreover, it is possible to reduce the unevenness of the loads that the needles 431 each receive from the journal 411 and thereby prevent a large reduction in the damping ability of the bearing 421. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, which is undesirable.

Similarly, the number of line contacts between the needles 432 and the journal 412 can be increased when the above formula is satisfied. It is possible to improve the rigidity by increasing the number of contacts between the needles 432 and the journal 412. Moreover, it is possible to reduce the unevenness of the loads that the needles 432 each receive from the journal 412 and thereby prevent a large reduction in the damping ability of the bearing 422. Further, by setting the parameter in the above range of Formula 1, the torsional rigidity can be improved as compared with the case where the parameter is set in a range smaller than the above range. If the parameter is set in a range larger than the above range, it may be not possible for the through hole 229 to have a required diameter size, which is undesirable.

In the speed reducer 100 according to the embodiment, the crankshaft 410 is made thick to improve the rigidity, the needles 431 to 434 are configured to have a predetermined thickness, and the number n1 and n2 of the needles are increased. Consequently, the crankshaft can have an appropriate size relative to the size of the speed reducer 100, unevenness of the loads that the needles 432 to 434 each receive is reduced to prevent reduction of damping, and the rigidity and the damping capability are increased while maintaining the durability.

Further, according to the embodiment, the rigidity and damping capability of the speed reducer are improved, which leads to an increase in operating speed and suppression of vibration at the time of deactivation when the invention is applied to robots and the like. At the same time, the friction in the speed reducer is also increased, which may improve controllability.

The aspects of the various embodiments described above may be combined to meet the requirements for the speed reducer.

The present invention may be applied to various gear devices having a crankshaft and a cylindrical needle bearing.

What is claimed is:

1. A speed reducer, comprising:
a case with internal teeth, the case having an outermost diameter D;
a plurality of crankshafts arranged on a circumference of an imaginary circle that has a diameter D2 and is centered on a central axis of the case, the crankshafts being spaced away from each other in a circumferential direction of the imaginary circle, each crankshaft having first external teeth;
a plurality of external tooth members each having second external teeth that mesh with the internal teeth of the case, the plurality of the external tooth members being eccentrically movable by the crankshafts; and
a carrier supporting the crankshafts in a rotatable manner, the carrier being rotatable by the crankshafts relative to the case,
wherein each of the plurality of crankshafts includes:
a plurality of eccentric members corresponding to the plurality of the external tooth members, each of the plurality of eccentric members having a diameter $dc_1$;
a crank journal corresponding to the carrier and having a diameter $dc_2$;
a number $n_1$ of first needles arranged around each of the plurality of eccentric members, each of the first needles having a diameter size $dr_1$; and
a number $n_2$ of second needles arranged around the crank journal, each of the second needles having a diameter size $dr_2$,
wherein $5.5 \leq D/dc_1 \leq 7.0$ is satisfied.

2. The speed reducer of claim 1, wherein the case is formed in a cylindrical shape having an outer diameter D1, and
wherein $4.5 \leq D_1/dc_1 \leq 6.0$ is satisfied.

3. The speed reducer of claim 2, wherein $5.0 \leq D_1/dc_2 \leq 6.5$ is satisfied.

4. The speed reducer of claim 1, wherein $2.0 \leq D_2/dc_1 \leq 3.0$ is satisfied.

5. The speed reducer of claim 1, wherein $6.0\ dc_1/dr_1 \leq 9.0$ is satisfied.

6. The speed reducer of claim 1, wherein $6.0 \leq D/dc_2 \leq 7.5$ is satisfied.

7. The speed reducer of claim 1, wherein $2.5 \leq D_2/dc_2 \leq 3.5$ is satisfied.

8. The speed reducer of claim 1, wherein $6.0\ dc_2/dr_2 \leq 9.0$ is satisfied.

9. The speed reducer of claim 1, wherein $0.85\ dc_2/dc_1 \leq 1.0$ is satisfied.

10. The speed reducer of claim 1, wherein $0.7 \leq n_1 \cdot dr_1/\pi(dc_1+dr_1) \leq 0.9$ is satisfied.

11. The speed reducer of claim 1, wherein $15.3 \leq n_1 \leq 28.3$ is satisfied.

12. The speed reducer of claim 1, wherein $0.7 \leq n_2 \cdot dr_2/\pi(dc_2+dr_2) \leq 0.9$ is satisfied.

13. The speed reducer of claim 1, wherein $15.3 \leq n_2 \leq 28.3$ is satisfied.

14. A speed reducer, comprising:
a case with internal teeth, the case having an outermost diameter D; and
a plurality of crankshafts arranged on a circumference of an imaginary circle that has a diameter D2 and is centered on a central axis of the case, the crankshafts being spaced away from each other in a circumferential direction of the imaginary circle, each crankshaft having an eccentric member that has a diameter $dc_1$,
wherein $5.5 \leq D/dc_1 \leq 7.0$ is satisfied.

15. The speed reducer of claim 14, wherein the case is formed in a cylindrical shape having an outer diameter D1, and
wherein $4.5 \leq D_1/dc_1 \approx 6.0$ is satisfied.

16. The speed reducer of claim 15, wherein each of the plurality of crankshafts includes a crank journal having a diameter $dc_2$, and
wherein $5.0 \leq D_1/dc_2 \leq 6.5$ is satisfied.

17. The speed reducer of claim 14, wherein $2.0 \leq D_2/dc_1 \leq 3.0$ is satisfied.

18. The speed reducer of claim 14, wherein each of the plurality of crankshafts includes a plurality of needles arranged around the eccentric member,
wherein each of the needles has a diameter size $dr_1$, and
wherein $6.0 \leq dc_1/dr_1 \leq 9.0$ is satisfied.

19. The speed reducer of claim 14, wherein each of the plurality of crankshafts includes:
a crank journal having a diameter $dc_2$; and
a plurality of needles arranged around the crank journal, wherein each of the needles has a diameter size $dr_2$,
wherein $6.0 \leq D/dc_2 \leq 7.5$ is satisfied.

20. The speed reducer of claim 14, wherein each of the plurality of crankshafts includes a crank journal having a diameter $dc_2$, and
wherein $2.5 \leq D_2/dc_2 \leq 3.5$ is satisfied.

* * * * *